US012630657B2

(12) United States Patent
Liu et al.

(10) Patent No.: US 12,630,657 B2
(45) Date of Patent: May 19, 2026

(54) BIMODAL POLYETHYLENE COPOLYMER AND FILM THEREOF

(71) Applicant: Dow Global Technologies LLC, Midland, MI (US)

(72) Inventors: Bo Liu, Lake Jackson, TX (US); John F. Szul, Hurricane, WV (US); Chuan C. He, Houston, TX (US); Roger L. Kuhlman, Lake Jackson, TX (US); Timothy R. Lynn, Glen Gardner, NJ (US)

(73) Assignee: Dow Global Technologies LLC, Midland, MI (US)

( * ) Notice: Subject to any disclaimer, the term of this patent is extended or adjusted under 35 U.S.C. 154(b) by 555 days.

(21) Appl. No.: 18/043,780

(22) PCT Filed: Sep. 20, 2021

(86) PCT No.: PCT/US2021/051020

§ 371 (c)(1),
(2) Date: Mar. 2, 2023

(87) PCT Pub. No.: WO2022/066550

PCT Pub. Date: Mar. 31, 2022

(65) Prior Publication Data

US 2023/0257498 A1      Aug. 17, 2023

Related U.S. Application Data

(60) Provisional application No. 63/081,416, filed on Sep. 22, 2020.

(51) Int. Cl.
| | |
|---|---|
| *C08F 210/16* | (2006.01) |
| *B29C 48/00* | (2019.01) |
| *C08F 2/01* | (2006.01) |
| *C08F 2/34* | (2006.01) |
| *C08F 4/645* | (2006.01) |
| *C08F 4/659* | (2006.01) |
| *C08F 4/6592* | (2006.01) |
| *B29K 23/00* | (2006.01) |

(52) U.S. Cl.
CPC ........ *C08F 210/16* (2013.01); *B29C 48/0018* (2019.02); *B29C 48/022* (2019.02); *C08F 2/01* (2013.01); *C08F 2/34* (2013.01); *C08F 4/65904* (2013.01); *C08F 4/65912* (2013.01); *C08F 4/65916* (2013.01); *C08F 4/65925* (2013.01); *B29K 2023/08* (2013.01)

(58) Field of Classification Search
CPC ...................................................... C08F 210/16
See application file for complete search history.

(56) References Cited

U.S. PATENT DOCUMENTS

| | | | |
|---|---|---|---|
| 5,332,706 A | 7/1994 | Nowlin et al. | |
| 5,539,076 A | 7/1996 | Nowlin et al. | |
| 5,882,750 A | 3/1999 | Mink et al. | |
| 6,274,684 B1 | 8/2001 | Loveday et al. | |
| 6,403,181 B1 | 6/2002 | Barry et al. | |
| 7,090,927 B2 | 8/2006 | Shannon et al. | |
| 8,110,644 B2 | 2/2012 | Coffy et al. | |
| 8,378,029 B2 | 2/2013 | Liu et al. | |
| 9,181,370 B2 * | 11/2015 | Sukhadia | C08F 210/08 |
| 11,208,512 B2 * | 12/2021 | Martin | B29C 49/0006 |
| 11,767,385 B2 * | 9/2023 | Liu | C08F 210/16 526/170 |
| 11,827,725 B2 * | 11/2023 | Borse | C08F 210/14 |
| 11,845,855 B2 * | 12/2023 | Chandak | C08F 4/65904 |
| 11,945,889 B2 * | 4/2024 | Liu | C08J 5/18 |
| 12,049,527 B2 * | 7/2024 | Mure | C08F 210/16 |
| 2006/0036041 A1 | 2/2006 | Kwalk | |
| 2006/0178482 A1 | 8/2006 | Kwalk | |
| 2007/0043177 A1 | 2/2007 | Michie et al. | |
| 2009/0036610 A1 | 2/2009 | Jaker | |
| 2020/0071509 A1 | 3/2020 | Borse et al. | |
| 2021/0147658 A1 | 5/2021 | Borse et al. | |
| 2022/0162358 A1 * | 5/2022 | Askar | C08F 210/16 |
| 2022/0169762 A1 * | 6/2022 | Askar | C07F 17/00 |

FOREIGN PATENT DOCUMENTS

| | | |
|---|---|---|
| WO | 2009148487 | 12/2009 |
| WO | 2019051006 | 3/2019 |
| WO | 2019241045 | 12/2019 |
| WO | 2020046663 | 3/2020 |
| WO | 2020068413 | 4/2020 |

OTHER PUBLICATIONS

PCT/US2021/051020, International Search Report and Written Opinion with a mailing date of Sep. 20, 2021.
PCT/US2021/051020, International Preliminary Report on Patentability with a mailing date of Mar. 28, 2023.

* cited by examiner

*Primary Examiner* — Rip A Lee

(57) ABSTRACT

A bimodal copolymer comprises on average at least 90 weight-percent units derived from ethylene and at least 0.05 weight percent units derived from an α-olefin comonomer having from 4 to 10 carbon atoms, wherein the copolymer has the properties described herein.

15 Claims, No Drawings

BIMODAL POLYETHYLENE COPOLYMER AND FILM THEREOF

FIELD

Embodiments of this invention relate to polyethylene copolymers, polymer formulations, films, manufactured articles, and related methods.

DESCRIPTION OF RELATED ART

It is known to make polyethylene copolymers that contain a bimodal distribution of molecular weights, which are called "bimodal polyethylene copolymers". Bimodal polyethylene copolymers can be produced in two or more reactors or in a single reactor using a bimodal catalyst system. Patent application publications relating to bimodal polyethylene copolymers and their production include US 2007/0043177 A1; US 2009/0036610 A1; US 2020/0071509 A1, WO 2009/148487 A1, WO 2019/241045 A1, WO 2020/046663 A1, and WO 2020/068413 A1. Patents relating to bimodal polyethylene copolymers and their production include U.S. Pat. Nos. 5,539,076; 5,882,750; 6,403,181 B1; U.S. Pat. Nos. 7,090,927; 8,110,644 B2; and 8,378,029 B2.

It is further known to produce films of polyethylene copolymers, such as by cast film extrusion or blown film extrusion. See, for example, LyondellBasell, A Guide to Polyolefin Film Extrusion, Publication 6047/1004 (available at lyb.com) and Qenos Pty, Ltd., Film Extrusion and Conversion—Technical Guide (July 2015) (available at qenos.com).

SUMMARY

One aspect of the present invention is a bimodal copolymer comprising on average at least 90 weight-percent units derived from ethylene monomer and at least 0.05 weight percent units derived from an α-olefin comonomer having 4-10 carbon atoms, wherein:

(a) The copolymer comprises at least 45 weight percent of a higher molecular weight fraction having a weight-average molecular weight ($M_w$) of at least 400,000; and (b) The copolymer comprises at least 35 weight percent of a lower molecular weight fraction having a weight-average molecular weight ($M_w$) of at most 50,000; and (c) The weight average molecular weight ($M_w$) of the higher molecular weight fraction is 30 to 50 times the weight average molecular weight ($M_w$) of the lower molecular weight fraction.

(d) The overall melt flow ratio ($I_{21}/I_2$) of the copolymer is at least 90; and (e) The overall Mz/Mw ratio of the copolymer is at least 8; and (f) The Oligomer Content of the copolymer is no more than 1000 ppm, as measured by the Gas Chromatography Method described herein;

A second aspect of the present invention is a bimodal copolymer comprising on average at least 90 weight-percent units derived from ethylene monomer and at least 0.05 weight percent units derived from an α-olefin comonomer having 4-10 carbon atoms, wherein:

(a) The copolymer comprises at least 45 weight percent of a higher molecular weight fraction having a weight-average molecular weight ($M_w$) of at least 400,000; and (b) The copolymer comprises at least 35 weight percent of a lower molecular weight fraction having a weight-average molecular weight ($M_w$) of at most 50,000; and (c) The overall melt flow ratio ($I_{21}/I_2$) of the copolymer is at least 90; and (d) The overall melt flow ratio ($I_{21}/I_5$) of the copolymer is 22-35; and (e) The overall Mz/Mw ratio of the copolymer is at least 8; and (f) The Oligomer Content of the copolymer is no more than 1000 ppm, as measured by the Gas Chromatography Method described herein.

A third aspect of the present invention is a bimodal copolymer comprising on average at least 90 weight-percent units derived from ethylene monomer and at least 0.05 weight percent units derived from an α-olefin comonomer having 4-10 carbon atoms, wherein:

(a) The copolymer comprises at least 45 weight percent of a higher molecular weight fraction having a weight-average molecular weight ($M_w$) of at least 400,000; and (b) The copolymer comprises at least 35 weight percent of a lower molecular weight fraction having a weight-average molecular weight ($M_w$) of at most 50,000; and (c) The overall melt flow ratio ($I_{21}/I_2$) of the copolymer is at least 90; and (d) The overall Mz/Mw ratio of the copolymer is at least 8; and (e) The Oligomer Content of the copolymer is no more than 1000 ppm, as measured by the Gas Chromatography Method described herein; and (f) The copolymer has a PENT value (2.4 MPa and 80° C.) of at least 600 (600.0) hours.

A fourth aspect of the present invention is a bimodal copolymer comprising on average at least 90 weight-percent units derived from ethylene monomer and at least 0.05 weight percent units derived from an α-olefin comonomer having 4-10 carbon atoms, wherein:

(a) The copolymer comprises at least 45 weight percent of a higher molecular weight fraction having a weight-average molecular weight ($M_w$) of at least 400,000; and (b) The copolymer comprises at least 35 weight percent of a lower molecular weight fraction having a weight-average molecular weight ($M_w$) of at most 50,000; and (c) The overall melt flow ratio ($I_{21}/I_2$) of the copolymer is at least 90; and (d) The overall Mz/Mw ratio of the copolymer is at least 8; and (e) The Oligomer Content of the copolymer is no more than 1000 ppm, as measured by the Gas Chromatography Method described herein; and (f) The copolymer was produced by polymerizing the ethylene monomer and the α-olefin comonomer in the presence of a bimodal catalyst that contains both:

(i) a (cyclopentadienyl)(1,5-dimethylindenyl)zirconium $(X)_2$ component, wherein X is a moiety that completes the valence of the zirconium; and (ii) a bis(2-(pentamethylphenylamido)ethyl)amine zirconium dibenzyl component.

A fifth aspect of the present invention is a bimodal copolymer comprising on average at least 90 weight-percent units derived from ethylene monomer and at least 0.05 weight percent units derived from an α-olefin comonomer having 4-10 carbon atoms, wherein:

(a) The copolymer comprises at least 45 weight percent of a higher molecular weight fraction having a weight-average molecular weight ($M_w$) of at least 400,000; and (b) The copolymer comprises at least 35 weight percent of a lower molecular weight fraction having a weight-average molecular weight ($M_w$) of at most 50,000; and (c) The overall melt flow ratio ($I_{21}/I_2$) of the copolymer is at least 90; and (d) The overall Mz/Mw ratio of the copolymer is at least 8; and (e) The Oligomer Content of the copolymer is no more than 1000 ppm, as measured by the Gas Chromatography Method described herein; and (f) The copolymer further comprises at least 20 ppb of one or more dimethyl-1H-indenyl compounds.

A sixth aspect of the present invention is a film comprising any of the bimodal copolymers.

A seventh aspect of the present invention is a method of making a blown film, the method comprising melting any of the bimodal copolymers to give a melt thereof, extruding the melt through a die configured for forming a bubble so as to make a bubble of the bimodal copolymer, and blowing (inflating) the bubble with a film-blowing machine, thereby making the blown film.

DETAILED DESCRIPTION

The Summary and Abstract are incorporated here by reference.

Definitions

The following definitions are used in this description:

Activator. A substance, other than the catalyst or one of the substrates, that increases the rate of a catalyzed reaction without itself being consumed. Typically, the activator contains aluminum and/or boron.

Bimodal Copolymer means an ethylene copolymer composition containing a higher molecular weight (HMW) copolymer component and a lower molecular weight (HMW) copolymer component. The relative terms "higher" and "lower" in HMW and LMW are used in reference to each other and merely mean that the weight-average molecular weight of the HMW component ($M_{w\_HMW}$) is greater than the weight-average molecular weight of the LMW component ($M_{w-LMW}$), i.e., $M_{w-HMW} > M_{w-LMW}$. The bimodal copolymer may be characterized by two peaks separated by a distinguishable local minimum therebetween in a plot of dW/dLog(MW) on the y-axis versus Log(MW) on the x-axis to give a Gel Permeation Chromatograph (GPC) chromatogram, wherein Log(MW) and dW/dLog (MW) are as defined herein and are measured by Gel Permeation Chromatograph (GPC) Test Method described herein.

Bimodal Catalyst means a catalyst system that contains two different catalysts for catalyzing polymerization of ethylene copolymers and producing a bimodal copolymer composition. The two catalysts usually differ from each other in at least one of the following characteristics: (a) their catalytic metals are different (such as Ti versus Zr, Zr versus Hf, Ti versus Hf; not activator metals such as Al); (b) one catalyst has a functional ligand bonded to its catalytic metal and the other catalyst is free of functional ligands bonded to its catalytic metal; (c) both catalysts have functional ligands bonded to their catalytic metal and the structure of at least one functional ligand of one catalyst is different than the structure of the functional ligand(s) of the other catalyst; and (d) for catalysts disposed on a support material, the compositions of the support materials are different. Two catalysts of a bimodal catalyst system may be disposed on the same support material, either on the same particles of the same support material or each on different particles of the same support material. When a catalyst system includes the same catalyst in terms of catalytic metal and ligands, wherein a portion thereof is disposed on a support material and a different portion thereof is dissolved in an inert solvent, the different portions do not by themselves constitute a bimodal catalyst system.

Catalyst. A material that initiates and/or enhances the reaction rate of the polymerization of ethylene and an α-olefin comonomer.

Catalyst system. A combination of a catalyst per se and a companion material such as an activator or other modifier compound for changing the reactivity of the catalyst, a support material on which the catalyst is disposed, a carrier material in which the catalyst is disposed, or a combination of any two or more thereof.

Dry. Generally, a moisture content from 0 to less than 5 parts per million based on total parts by weight. Materials fed to the reactor(s) during a polymerization reaction are dry.

Ethylene. A polymerizable monomer of formula $H_2C{=}CH_2$.

Feed. Quantity of reactant or reagent that is added or "fed" into a reactor. In continuous polymerization operation, each feed independently may be continuous or intermittent. The quantities or "feeds" may be measured, e.g., by metering, to control amounts and relative amounts of the various reactants and reagents in the reactor at any given time.

Feed line. A pipe or conduit structure for transporting a feed.

Film: An article restricted in one dimension. The restricted dimension may be called a thickness of the film, and the thickness (gauge variation) is substantially uniform therein.

1-hexene. A polymerizable monomer of formula $H_2C{=}C$ $(H)CH_2CH_2CH_2CH_3$.

Inert. Generally, not appreciably reactive or not appreciably interfering in the inventive polymerization reaction. The term "inert" as applied to the purge gas or ethylene feed means a molecular oxygen ($O_2$) content from 0 to less than 5 parts per million based on total parts by weight of the purge gas or ethylene feed.

Internal bubble cooling or IBC is an aspect of film blowing performed by actively using ancillary, special purpose IBC equipment such as that of US 2002/0150648 A1 to R. E. Cree.

Linear α-olefin. A polymerizable monomer of formula $H_2C{=}C(H)(CH_2)_rCH_3$, wherein r is a number from 0 to 7.

Metallocene catalyst. Homogeneous or heterogeneous material that contains a cyclopentadienyl ligand-metal complex and enhances olefin polymerization reaction rates. Substantially single site or dual site. Each metal is a transition metal, alternatively Ti, Zr, or Hf. Each cyclopentadienyl ligand independently is an unsubstituted cyclopentadienyl group or a hydrocarbyl-substituted cyclopentadienyl group. In some aspects the metallocene catalyst has two cyclopentadienyl ligands, and at least one, alternatively both cyclopentadienyl ligands independently is/are a hydrocarbyl-substituted cyclopentadienyl group.

Oligomer Content. The content of lower-molecular weight polymerized molecules in the copolymer, as measured by the Gas Chromatography Method described herein.

Trim catalyst. A metallocene catalyst that is similar to one metallocene catalyst in the bimodal catalyst system. Trim catalyst is usually fed to the polymerization reactor to provide additional control over the ratio of lower molecular weight fraction to higher molecular weight fraction in the resulting bimodal copolymer.

VOC Content. The content of volatile organic compounds in the copolymer as measured by the Full Evaporation Method described herein.

Description of the Bimodal Copolymer

The bimodal copolymer of the present invention is a collection of macromolecules that comprise repeating units derived from ethylene monomer and repeating units derived from an α-olefin comonomer having 4 to 10 carbon atoms. The comonomer is may be a linear α-olefin. The comonomer may be 1-butene, 1-pentene, 1-hexene, 1-heptene or 1-octene; alternatively 1-butene or 1-hexene, alternatively 1-hexene.

At least 90 weight percent of the repeating units should be derived from ethylene, alternatively at least 95 and alternatively at least 97. No more than 99.95 weight percent of the repeating units should be derived from ethylene, alternatively no more than 99.5 weight percent and alternatively no more than 99 weight percent. At least 0.05 weight percent of the repeating units should be derived from the comonomer, alternatively at least 0.5 weight percent, and alternatively at least 1 weight percent. No more than 10 weight percent of the repeating units should be derived from the comonomer, alternatively no more than 5 weight percent and alternatively no more than 3 weight percent. Alternatively, essentially all of the repeating units in the copolymer are derived from ethylene or 1-hexene, meaning that the quantity of repeating units derived from other monomers is small enough that it does not materially change the physical properties of the copolymer.

The copolymer may have a density of at least 0.93 g/mL, alternatively at least 0.94 g/mL, alternatively at least 0.946 g/mL. The copolymer may have a density of at most 0.97 g/mL, alternatively at most 0.96 g/mL, alternatively at most 0.954 g/mL.

The overall number-average molecular weight ($M_n$) of the copolymer may be at least 6000, alternatively at least 7000, alternatively at least 7500. The overall number-average molecular weight ($M_n$) of the copolymer may be at most 9000, alternatively at most 8000, alternatively at most 7900.

The overall weight-average molecular weight ($M_w$) of the copolymer may be at least 250,000, alternatively at least 270,000, alternatively at least 280,000. The overall weight-average molecular weight ($M_w$) of the copolymer may be at most 350,000, alternatively at most 320,000, alternatively at most 300,000.

The overall Z-average molecular weight ($M_z$) of the copolymer may be at least 2,000,000, alternatively at least 2,500,000, alternatively at least 3,000,000. The overall Z-average molecular weight ($M_z$) of the copolymer may be at most 4,500,000, alternatively at most 4,000,000, alternatively at most 3,500,000.

The overall polydispersity index of the copolymer (measured as $M_w/M_n$) may be at least 30, alternatively at least 35, alternatively at least 37. The overall polydispersity index of the copolymer (measured as $M_w/M_n$) may be at most 50, alternatively at most 45, alternatively at most 40.

The ratio $M_z/M_w$ for the overall copolymer is at least 8. The ratio $M_z/M_w$ for the overall copolymer may be at least 9 and alternatively at least 10. The ratio $M_z/M_w$ for the overall copolymer may be at most 16, alternatively at most 15, alternatively at most 14.

The copolymer comprises at least 45 weight percent of a higher molecular weight fraction having a weight-average molecular weight (Mw) of at least 400,000 and at least 35 weight percent of a lower molecular weight fraction having a weight-average molecular weight (Mw) of at most 50,000. The higher molecular weight fraction alternatively makes up at least 48 weight percent of the overall copolymer, alternatively makes up at least 50 weight percent of the overall copolymer, alternatively makes up at least 52 weight percent. The higher molecular weight fraction makes up at most 65 weight percent of the overall copolymer, alternatively at most 60 weight percent of the overall copolymer, and alternatively at most 55 weight percent. The lower molecular weight fraction alternatively makes up at least 40 weight percent of the overall copolymer and alternatively at least 42 weight percent of the overall copolymer. The lower molecular weight fraction makes up at most 55 weight percent of the overall copolymer, alternatively at most 50 weight percent of the overall copolymer, and alternatively at most 48 weight percent. In a preferred embodiment, the higher molecular weight fraction makes up 50 to 55 weight percent of the overall copolymer, and the lower molecular weight fraction makes 40 to 45 weight percent of the overall copolymer. (Weight percentages count only polymeric components and do not include additives, fillers, and the like.)

The higher molecular weight fraction alternatively meets the following molecular weight profile:

The number-average molecular weight ($M_n$) of the higher molecular weight fraction may be at least 100,000, alternatively at least 106,000, alternatively at least 108,000. The number-average molecular weight ($M_n$) of the higher molecular weight fraction may be at most 120,000, alternatively at most 115,000, alternatively at most 111,000.

The weight-average molecular weight ($M_w$) of the higher molecular weight fraction may be at least 450,000, alternatively at least 480,000, alternatively at least 505,000. The weight-average molecular weight ($M_w$) of the higher molecular weight fraction may be at most 600,000, alternatively at most 550,000, alternatively at most 520,000.

The polydispersity index of the higher molecular weight fraction (measured as $M_w/M_n$) may be at least 3.5, alternatively at least 4.0, alternatively at least 4.5. The polydispersity index of the higher molecular weight fraction (measured as $M_w/M_n$) may be at most 8, alternatively at most 6, alternatively at most 5.

The lower molecular weight fraction alternatively meets the following molecular weight profile:

The number-average molecular weight ($M_n$) of the lower molecular weight fraction may be at least 2500, alternatively at least 3000, alternatively at least 3500. The number-average molecular weight ($M_n$) of the lower molecular weight fraction may be at most 10,000, alternatively at most 6000, alternatively at most 4000.

The weight-average molecular weight ($M_w$) of the lower molecular weight fraction may be at least 8000, alternatively at least 10,000, alternatively at least 12,000. The weight-average molecular weight ($M_w$) of the lower molecular weight fraction may be at most 25,000, alternatively at most 16,000, alternatively at most 14,000.

The polydispersity index of the lower molecular weight fraction (measured as $M_w/M_n$) may be at least 1.5, alternatively at least 2, alternatively at least 3. The polydispersity index of the lower molecular weight fraction (measured as $M_w/M_n$) may be at most 8, alternatively at most 6, alternatively at most 5.

The content of repeating units derived from the α-olefin comonomer in the higher molecular weight fraction may be greater than the content of repeating units derived from the comonomer in the lower molecular weight fraction. Alternatively, the weight percent of repeating units derived from comonomer in the higher molecular weight fraction is at least 1.1 times of the weight percent of repeating units derived from comonomer in the lower molecular weight fraction, alternatively at least 1.3 times, alternatively at least 1.5 times. Alternatively, the weight percent of repeating units derived from the comonomer in the higher molecular weight fraction is at most 10 times of the weight percent of repeating units derived from the comonomer in the lower molecular weight fraction, alternatively at most 5 times, alternatively at most 3 times.

The Oligomer Content of the copolymer is no more than 1000 parts-per-million by weight (ppmw), alternatively no more than 750 ppmw, alternatively no more than 650 ppmw, alternatively no more than 600 ppmw. There is no desired minimum Oligomer Content, but often it is impractical to reduce Oligomer Content below 100 ppmw. Low Oligomer Content is desirable because oligomers are susceptible to degrading during polymer processing, which can harm the aesthetics of the processed polymer.

The VOC Content of the copolymer under typical fabrication conditions may be as low as practical to reduce emissions during fabrication of articles made from that copolymer.

Polyethylene copolymers are normally characterized based on the viscosity of the molten polymer. Copolymers of this invention alternatively have a melt flow ratio ($I_{21}/I_2$) that is at least 90. Copolymers of this invention, alternatively have the following melt flow characteristics:

Both before and after oxygen tailoring, the flow index ($I_{21}$) may be at least 7 dg/min, alternatively at least 8 dg/min, alternatively at least 8.2 dg/min. Both before and after oxygen tailoring, the flow index ($I_{21}$) may be at most 15 dg/min, alternatively at most 12 dg/min, alternatively at most 10 dg/min.

The melt flow ratio ($I_{21}/I_2$) before oxygen tailoring (described in the discussion of pelleting below) is alternatively at least 93, alternatively at least 96. The melt flow ratio ($I_{21}/I_2$) before oxygen tailoring may be at most 130, alternatively at most 120, alternatively at most 110.

The melt flow ratio ($I_{21}/I_2$) after oxygen tailoring may be at least 105 and alternatively at least 115. The melt flow ratio ($I_{21}/I_2$) after oxygen tailoring may be at most 170, alternatively at most 150, alternatively at most 135.

The melt flow ratio ($I_{21}/I_5$) may be at least 20, alternatively at least 22, alternatively at least 28. The melt flow ratio ($I_{21}/I_5$) may be at most 40, alternatively at most 35, alternatively at most 32. These levels may be achieved after oxygen tailoring, even though the copolymer has lower levels before oxygen tailoring.

Polyethylene copolymers are commonly tested for a variety of physical characteristics related to strength, flexibility, toughness and impact and crack resistance.

Copolymers of the present invention alternatively have a PENT value (2.4 MPa and 80° C.) of at least 600 (600.0) hours, indicating a high resistance to cracking under stress. The PENT value (2.4 MPa and 80° C.) is alternatively at least 800 (800.0) hours, alternatively at least 1000 (1000.0) hours. The PENT value (3.0 MPa and 80° C.) may be at least 300 (300.0) hours, alternatively at least 500 (500.0) hours, alternatively at least 700 (700.0) hours. There is no desired maximum PENT value, but values greater than 5000 (5000.0) hours or 4000 (4000.0) hours are usually unnecessary. In some embodiments the maximum PENT value (2.4 MPa and 80° C.) is 1500 (1500.0) hours, alternatively 1400 (1400.0) hours. In some embodiments the PENT value (2.4 MPa and 80° C.) is from 1200 (1200.0) to 1400 (1400.0) hours. In some embodiments the maximum PENT value (3.0 MPa and 80° C.) is 1000 (1000.0) hours, alternatively 900 (900.0) hours. In some embodiments the PENT value (3.0 MPa and 80° C.) is from 600 (600.0) to 900 (900.0) hours.

Copolymers of the present invention alternatively have a dart impact resistance of at least 350 g, alternatively at least 400 g, alternatively at least 450 g. There is no desired maximum dart impact resistance, but values greater than 500 g or 600 g are usually unnecessary.

Copolymers of the present invention have a combination of traits that is particularly suitable for use in high stalk blown film fabrication. The melt characteristics of the polymer make them easily processable. The molecular weight profile makes them strong and flexible. The low Oligomer Content minimizes degradation during processing.

Polymerization Reactor and Method

Copolymers of the present invention are produced by polymerizing ethylene monomer and the α-olefin comonomer in a reactor with a catalyst, and optionally with other reagents and diluents. The polymerization may take place in a liquid phase, slurry phase or gas phase, but alternatively takes place in a gas phase.

To produce the bimodal molecular weight distribution, the copolymers can be produced in a two-stage polymerization or a one-stage polymerization but are alternatively made in a one-stage polymerization.

In a two stage polymerization, the higher molecular weight component is polymerized by a first catalyst in a first reactor under a first set of process conditions and the lower molecular weight component is made by a second catalyst in a second reactor under a second set of process conditions. Examples of such production are described in the following patent publications, which are incorporated herein by reference: U.S. Pat. Nos. 5,627,242; 5,665,818; 5,677,375; US 2007/0043177 A1, EP-A-0 794 200; EP-B1-0 649 992; EP-A-0 802 202; EP-B-634421 and WO 2009/148,487 A1.

In a one-stage polymerization, the higher molecular weight component and the lower molecular weight component are both polymerized in single reactor using a Bimodal Catalyst. The single stage polymerization alternatively takes place in fluidized-bed gas-phase polymerization reactor (FB-GPP reactor), using a Bimodal Catalyst. Such reactors and methods are well-known in the art. For example, FB-GPP reactors and methods are as described in the following patent publications, which are incorporated herein by reference: U.S. Pat. Nos. 3,709,853; 4,003,712; 4,011,382; 4,302,566; 4,543,399; 4,882,400; 5,352,749; 5,541,270; US 2020/0024376 A1, US 2020/024376 A1, US 2018/0155473 A1, and WO 2016/172279 A1.

The best operating conditions to produce the polymers of this invention vary depending on the reactor that is used, the Catalyst System that is used, and the specific properties desired for the copolymer. The following discussion describes ordinary conditions for common FB-GPP reactors using the Bimodal Catalyst described below:

The molar ratio ($C_x/C_2$) of comonomer and ethylene being fed into the reactor may be at least 0.0001, alternatively at least 0.0002, alternatively at least 0.0004. The molar ratio ($C_x/C_2$) of comonomer and ethylene being fed into the reactor may be at most 0.1, alternatively at most 0.05, alternatively at most 0.02.

The ethylene partial pressure in the reactor may be at least 690 kPa (100 psia), alternatively at least 830 kPa (120 psia), alternatively at least 1300 kPa (190 psia). The ethylene partial pressure in the reactor may be at most 2070 kPa (300 psia), alternatively at most 1720 kPa (250 psia), alternatively at most 1590 kPa (230 psia).

The hydrogen to ethylene ($H_2/C_2$) molar ratio in the reactor varies depending on the molecular weights of the polymers being produced. The hydrogen to ethylene ($H_2/C_2$) molar ratio may be at least 0.0003 and alternatively at least 0.001. The hydrogen to ethylene ($H_2/C_2$) molar ratio may be at most 0.01 and alternatively at most about 0.006.

The Catalyst System (described below) may be fed into the polymerization reactor in "dry mode" or "wet mode. The dry mode is a dry powder or granules. The wet mode is a suspension in an inert liquid such as mineral oil. Alternatively, the Catalyst System is fed in wet mode.

Optionally, the Catalyst System may comprise the main catalyst plus a "trim catalyst" that provides additional control over the ratio of the higher molecular weight component to the lower molecular weight component in the final copolymer. For example, the trim catalyst may contain catalytic material that supplements the formation of either the higher molecular weight component or the lower molecular weight component of the copolymer. Use of trim catalysts is described in greater detail in the PCT patent publications WO 2015/123172A1 and WO 2015/123179A1, which are incorporated herein by reference.

The bed temperature in the reactor may be at least 70° C., alternatively at least 80° C., alternatively at least 85° C. The bed temperature in the reactor may be at most 110° C., alternatively at most 100° C., alternatively at most 95° C.

The flow of reactants through the reactor may be at a rate sufficient to maintain the bed of the reactor in a fluidized state.

Optionally, an inert liquid (called an induced condensing agent or Induced Conden. Agent (ICA)) may be added to the reactor to assist in cooling the reactor. The ICA may be a ($C_5$ to $C_{20}$) alkane, alternatively a ($C_5$ to $C_{10}$)alkane, alternatively pentane or 2-methylbutane (i.e., isopentane). Use of ICA is described in the following patent publications, which are incorporated herein by reference: U.S. Pat. Nos. 4,453,399; 4,588,790; 4,994,534; 5,352,749; 5,462,999; and 6,489,408. The concentration of ICA may be at least 1 mole percent and alternatively at least 3 mole percent. The concentration of ICA may be at most 20 mole percent and alternatively at most 8 mole percent.

Optionally, a continuity additive may be added to the reactor to control sheeting in the reactor. Suitable continuity additives are commercially available from Univation Technologies LLC as CA-200 and CA-300. The concentration of continuity additive may be at least 0.5 ppmw and alternatively at least 30 ppmw. The concentration of continuity additive may be at most 200 ppmw and alternatively at most 80 ppmw.

The polymerization conditions may further include one or more additives such as a chain transfer agent or a promoter. The chain transfer agents are well known and may be alkyl metal such as diethyl zinc. Promoters are known such as in U.S. Pat. No. 4,988,783 and may include chloroform, $CFCl_3$, trichloroethane, and difluorotetrachloroethane. Prior to reactor start up, a scavenging agent may be used to react with moisture and during reactor transitions a scavenging agent may be used to react with excess activator. Scavenging agents may be a trialkylaluminum. Gas phase polymerizations may be operated free of (not deliberately added) scavenging agents. The polymerization conditions for gas phase polymerization reactor/method may further include an amount (such as 0.5 to 200 ppm based on all feeds into reactor) of a static control agent and/or a continuity additive such as aluminum stearate or polyethyleneimine. The static control agent may be added to the FB-GPP reactor to inhibit formation or buildup of static charge therein.

The start-up of a recommissioned FB-GPP reactor (cold start) or restart of a transitioning FB-GPP reactor (warm start) includes a time period that is prior to reaching steady-state polymerization conditions. Start-up or restart may include the use of a polymer seedbed preloaded into the fluidized bed reactor. The polymer seedbed may be composed of powder of a polyethylene; it may be a bimodal copolymer similar to the bimodal copolymer that is intended to be made.

Start-up or restart of the FB-GPP reactor may also include gas atmosphere transitions comprising purging air or other unwanted gas(es) from the reactor with a dry (anhydrous) inert purge gas, followed by purging the dry inert purge gas from the FB-GPP reactor with dry ethylene gas. The dry inert purge gas may consist essentially of molecular nitrogen ($N_2$), argon, helium, or a mixture of any two or more thereof. When not in operation, prior to start-up (cold start), the FB-GPP reactor contains an atmosphere of air. The dry inert purge gas may be used to sweep the air from a recommissioned FB-GPP reactor during early stages of start-up to give a FB-GPP reactor having an atmosphere consisting of the dry inert purge gas. Prior to restart (e.g., after a change in seedbeds), a transitioning FB-GPP reactor may contain an atmosphere of unwanted ICA or other unwanted gas or vapor. The dry inert purge gas may be used to sweep the unwanted vapor or gas from the transitioning FB-GPP reactor during early stages of restart to give the FB-GPP reactor an atmosphere consisting of the dry inert purge gas. Any dry inert purge gas may itself be swept from the FB-GPP reactor with the dry ethylene gas. The dry ethylene gas may further contain molecular hydrogen gas such that the dry ethylene gas is fed into the fluidized bed reactor as a mixture thereof. Alternatively, the dry molecular hydrogen gas may be introduced separately and after the atmosphere of the fluidized bed reactor has been transitioned to ethylene. The gas atmosphere transitions may be done prior to, during, or after heating the FB-GPP reactor to the reaction temperature of the polymerization conditions.

Start-up or restart of the FB-GPP reactor also includes introducing feeds of reactants and reagents thereinto. The reactants include the ethylene and the alpha-olefin (e.g., 1-hexene). The reagents fed into the fluidized bed reactor include the molecular hydrogen gas and the induced condensing agent (ICA) and the Bimodal Catalyst System and the trim catalyst.

Catalysts, Support Materials, Activators

Two-reactor polymerizations of bimodal copolymers can be carried out using conventional Catalyst Systems. One-reactor polymerizations of bimodal copolymers are typically carried out using a Bimodal Catalyst that has one catalyst component which is especially suited to make the higher molecular weight (HMW) fraction of the copolymer and another which is especially suited to make the lower molecular weight (LMW) fraction of the copolymer. Preferred Bimodal Catalyst systems preferentially direct a greater portion of the α-olefin comonomer into the higher molecular weight fraction; such Bimodal Catalysts (and processes to make them) are described in the following patent publications, which are incorporated herein by reference: US 2020/048379 A1, US 2020/024376 A1, US 2018/0155473 A1, WO 2016/172279 A1.

Bimodal Catalyst systems that are especially useful to produce the copolymers are described in U.S. Patent Application 62/880,826, titled "Bimodal Poly(Ethylene-Co-1-Alkene) Copolymer Bimodal Poly(Ethylene-Co-1-Alkene) Copolymer" and filed on Jul. 31, 2019; U.S. Patent Application 62/990,549, titled "Metal-Ligand Complexes" and filed on Mar. 17, 2020; and PCT Application PCT/US20/30033, titled "Metal-Ligand Complexes" and filed on Apr. 27, 2020, which are incorporated herein by reference.

The preferred Catalyst Systems comprise a bis(2-(pentamethylphenylamido)ethyl)-amine zirconium dibenzyl component and a (cyclopentadienyl)(1,5-dimethylindenyl) zirconium $(X)_2$ component, wherein X is a moiety that completes the valence of the zirconium. X may be a halide or an alkyl group containing 1-4 carbon atoms and is alternatively a methyl group. Without being bound by theory, it is believed that the bis(2-(pentamethylphenylamido)ethyl)-amine zirconium dibenzyl is effective for making the HMW component of the bimodal copolymer and the (cyclopentadienyl)(1,5-dimethylindenyl)zirconium dimethyl is effective for making the LMW component of the bimodal copolymer.

The HMW catalyst and the LMW catalyst in the Bimodal Catalyst system may be kept separate until they are added to the reactor, in which case each catalyst may be unsupported or deposited on its own support. Alternatively, the HMW catalyst and the LMW catalyst in the bimodal catalyst system are deposited together on a single support.

Alternatively, the catalysts of the Bimodal Catalyst system are applied on a solid support material, such as by spray-drying. The support material alternatively comprises a porous inorganic substance or organic substance. It alternatively comprises a Group 2, 3, 4, 5, 13 or 14 metal oxide, and alternatively comprises a Group 13 or 14 metal oxide. Examples of inorganic oxide-type support materials are silica, alumina, titania, zirconia, thoria, and mixtures of any two or more of such inorganic oxides. The solid support material is alternatively a hydrophobic fumed silica (such as a fumed silica treated with dimethyldichlorosilane).

The inorganic oxide support material is porous and has variable surface area, pore volume, and average particle size. In some embodiments, the surface area is from 50 to 1000 square meter per gram ($m^2$/g) and the average particle size is from 20 to 300 micrometers (pm). Alternatively, the pore volume is from 0.5 to 6.0 cubic centimeters per gram ($cm^3$/g) and the surface area is from 200 to 600 $m^2$/g. Alternatively, the pore volume is from 1.1 to 1.8 $cm^3$/g and the surface area is from 245 to 375 $m^2$/g. Alternatively, the pore volume is from 2.4 to 3.7 $cm^3$/g and the surface area is from 410 to 620 $m^2$/g. Alternatively, the pore volume is from 0.9 to 1.4 $cm^3$/g and the surface area is from 390 to 590 $m^2$/g. Each of the above properties are measured using conventional techniques known in the art.

Prior to being contacted with a catalyst, the support material may be pre-treated by heating the support material in air to give a calcined support material. The pre-treating comprises heating the support material at a peak temperature from 350° to 850° C., alternatively from 400° to 800° C., alternatively from 400° to 700° C., alternatively from 500° to 650° C. and for a time period from 2 to 24 hours, alternatively from 4 to 16 hours, alternatively from 8 to 12 hours, alternatively from 1 to 4 hours, thereby making a calcined support material. In some aspects the support material is a calcined support material.

alternatively, the Bimodal Catalyst system comprises from 1.0 to 5.0 weight percent bis(2-(pentamethylphenylamido)ethyl)amine zirconium dibenzyl and from 0.1 to 2.0 weight percent (cyclopentadienyl)(1,5-dimethylindenyl) zirconium dimethyl, applied to a fumed silica support.

The trim catalyst may be any HMW catalyst or LMW catalyst. The trim catalyst may be the same as either the HMW catalyst or the LMW catalyst in the bimodal catalyst system. For the most preferred catalyst system, the trim catalyst may be (cyclopentadienyl)(1,5-dimethylindenyl)zirconium dimethyl.

For convenience, the trim catalyst may be fed into the reactor in solution in a hydrocarbon solvent. The hydrocarbon solvent may be an alkane, or a mixture of alkanes, wherein each alkane independently has from 5 to 20 carbon atoms, alternatively from 5 to 12 carbon atoms, alternatively from 5 to 10 carbon atoms. Each alkane independently may be acyclic or cyclic. Each acyclic alkane independently may be straight chain or branched chain. Examples of acyclic alkane include pentane, 1-methylbutane (isopentane), hexane, 1-methylpentane (isohexane), heptane, 1-methylhexane (isoheptane), octane, nonane, decane, or a mixture of any two or more thereof. Examples of cyclic alkane include cyclopentane, cyclohexane, cycloheptane, cyclooctane, cyclononane, cyclodecane, methycyclopentane, methylcyclohexane, dimethylcyclopentane, or a mixture of any two or more thereof.

Each catalyst of the Bimodal Catalyst system and the trim catalyst may be activated by contacting it with at least one activator. Activators are alternatively a Lewis acid, a non-coordinating ionic activator, or an ionizing activator, or a Lewis base, an alkylaluminum, or an alkylaluminoxane (alkylalumoxane). The alkylaluminum may be a trialkylaluminum, alkylaluminum halide, or alkylaluminum alkoxide (diethylaluminum ethoxide). The trialkylaluminum may be trimethylaluminum, triethylaluminum ("TEAL"), tripropylaluminum, or tris(2-methylpropyl)aluminum. The alkylaluminum halide may be diethylaluminum chloride. The alkylaluminum alkoxide may be diethylaluminum ethoxide. The alkylaluminoxane may be a methylaluminoxane (MAO), ethylaluminoxane, 2-methylpropyl-aluminoxane, or a modified methylaluminoxane (MMAO). Each alkyl of the alkylaluminum or alkylaluminoxane independently may be a ($C_1$ to $C_7$)alkyl, alternatively a ($C_1$ to $C_6$)alkyl, alternatively a ($C_1$ to $C_4$)alkyl. The molar ratio of activator's metal (Al) to a particular catalyst compound's metal (catalytic metal, e.g., Zr) may be 1000:1 to 0.5:1, alternatively 300:1 to 1:1, alternatively 150:1 to 1:1. Suitable activators are commercially available.

Each contacting step between activator and catalyst independently may be done either (a) in a separate vessel outside the GPP reactor (e.g., outside the FB-GPP reactor), (b) in a feed line to the GPP reactor, and/or (c) inside the GPP reactor (in situ). In option (a) the Bimodal Catalyst system, once its catalysts are activated, may be fed into the GPP reactor as a dry powder, alternatively as a slurry in a non-polar, aprotic (hydrocarbon) solvent. In option (c) the Bimodal Catalyst system may be fed into the reactor prior to activation via a first feed line, the first activator may be fed into the reactor via a second feed line, the trim catalyst may be fed into the reactor via a third feed line, and the second activator may be feed into the reactor via a fourth feed line. Any two of the first to fourth feed lines may be the same or different. The activator(s) may be fed into the reactor in "wet mode" in the form of a solution thereof in an inert liquid such as mineral oil or toluene, in slurry mode as a suspension, or in dry mode as a powder. Each contacting step may be done in separate vessels, feed lines, or reactors at the same or different times, or in the same vessel, feed line, or reactor at different times, to separately give the Bimodal Catalyst system and trim catalyst. Alternatively, the contacting steps may be done in the same vessel, feed line, or reactor at the same time to give a mixture of the Bimodal Catalyst system and trim catalyst in situ.

The preferred Bimodal Catalyst system will ordinarily leave a residue of one or more dimethyl-1 H-indenyl compounds in the copolymer after polymerization is complete. The dimethyl-1H-indenyl compounds are reaction/decomposition products from the (cyclopentadienyl)(1,5-dimeth-ylindenyl)zirconium of the Bimodal Catalyst. Alternatively, the dimethyl-1H-indenyl compounds primarily comprise 3,6-dimethyl-1H-indene and/or 1,5-dimethyl-1H-indene. The copolymer alternatively comprises at least 20 parts-per-billion by weight (ppbw) of dimethyl-1H-indenyl compounds, alternatively at least 40 ppbw, alternatively at least 100 ppbw. The copolymer alternatively comprises at most 400 parts-per-billion by weight (ppbw) of dimethyl-1H-indenyl compounds, alternatively at most 360 ppbw, alternatively at most 200 ppbw.

Pelleting and Oxygen Treatment

The copolymer typically is recovered from the reactor as copolymer granules. The granules are alternatively converted to pellets, normally by extrusion as strands that are subsequently cut into pellets. In the extrusion process, additives may be added such as stabilizers. Further, in the extrusion process, the copolymer may be "oxygen tailored" by exposure to an oxygen-containing gas such as air in the extruder. Extrusion with oxygen tailoring is described in US 789246662.

Film

The copolymer granules or pellets may be formed into shaped articles. A preferred shaped article is a film. The film may be made using any extrusion or co-extrusion methods including blown film, tentered film, and cast film methods. Film extrusion equipment is commercially available, and its use is well-known. The film of alternatively made using blown film extrusion.

The film may be unoriented, uniaxially oriented, or biaxially oriented. The uniaxially film may be oriented in the direction of extrusion (machine direction or MD), alternatively in the direction transverse to the direction of extrusion (transverse direction or TD). The biaxially oriented film may be oriented in both MD and TD by stretching or pulling in the MD, simultaneously or followed by stretching or pulling in the TD.

The resulting film may be a monolayer film, or the copolymers may be extruded as a layer in a multilayer film or laminate. The film thickness may be at least 0.0051 mm (0.200 mil) and alternatively at least 0.0077 mm (0.300 mil). The film thickness may be at most 0.051 mm (2 mils), alternatively at most 0.0254 mm (1.00 mils), alternatively at most 0.0203 mm (0.80 mils), alternatively at most 0.0152 mm (0.6 mils).

Film additives may optionally be added to the copolymer during the pelleting step or in the extruder during film formation. A "film additive" is a compound or material other than a polyolefin polymer that imparts one or more properties to, and/or enhances one or more properties of, the blown film. Examples of film additives are antimicrobial agents, antioxidants, catalyst neutralizers (of single site catalysts), colorants, and light stabilizers. Some species of blown films alternatively contain and alternatively consist essentially of the bimodal copolymer, at least one antioxidant, and at least one catalyst neutralizer.

The film is useful for making containers and wraps used in numerous food and non-food packaging applications. Examples of such containers are bags such as ice bags and grocery bags. Examples of such wraps are stretch films, meat wraps, and food wraps. The inventive copolymer is also useful in a variety of non-film related applications including in vehicle parts.

Packaging manufacturers and consumers want to reduce the amount of plastic in the film, in order to reduce both the cost of the packaging and the environmental impact of packaging. Improved mechanical and physical properties of the film can allow the film to be thinner while meeting the needs of the user. Packaging manufacturers further want to maintain easy processability and minimize oligomer in the pellets they use, in order to maintain the best processing and clarity for the films they make. The copolymers of the present invention have low Oligomer Content, plus flow characteristics and melt elasticity that provide easy processability. When fabricated properly, the copolymers of the present invention can provide films with improved physical properties over similar films outside the invention, such as improved transverse direction tear strength/resistance, puncture resistance and/or impact resistance. Without intending to be bound, we hypothesize that the improved properties result from the molecular weight distribution of the polymer and the distribution of comonomer within the higher molecular weight and lower molecular weight fractions of the copolymer.

Numbered Aspects of Certain Embodiments of the Invention

The present invention may include any of the following numbered aspects:

1. A bimodal copolymer comprising on average at least 90 weight-percent units derived from ethylene monomer and at least 0.05 weight percent units derived from an $\alpha$-olefin comonomer having 4-10 carbon atoms, wherein:
(a) The copolymer comprises at least 45 weight percent of a higher molecular weight fraction having a weight-average molecular weight ($M_w$) of at least 400,000; and
(b) The copolymer comprises at least 35 weight percent of a lower molecular weight fraction having a weight-average molecular weight ($M_w$) of at most 50,000; and
(c) The weight average molecular weight ($M_w$) of the higher molecular weight fraction is 30 to 50 times the weight average molecular weight ($M_w$) of the lower molecular weight fraction.
(d) The overall melt flow ratio ($I_{21}/I_2$) of the copolymer is at least 90; and
(e) The overall Mz/Mw ratio of the copolymer is at least 8; and
(f) The Oligomer Content of the copolymer is no more than 1000 ppm, as measured by the Gas Chromatography Method described herein;

2. A bimodal copolymer comprising on average at least 90 weight-percent units derived from ethylene monomer and at least 0.05 weight percent units derived from an $\alpha$-olefin comonomer having 4-10 carbon atoms, wherein:
(a) The copolymer comprises at least 45 weight percent of a higher molecular weight fraction having a weight-average molecular weight ($M_w$) of at least 400,000; and
(b) The copolymer comprises at least 35 weight percent of a lower molecular weight fraction having a weight-average molecular weight ($M_w$) of at most 50,000; and
(c) The overall melt flow ratio ($I_{21}/I_2$) of the copolymer is at least 90; and
(d) The overall melt flow ratio ($I_{21}/I_5$) of the copolymer is 22-35; and
(e) The overall Mz/Mw ratio of the copolymer is at least 8; and
(f) The Oligomer Content of the copolymer is no more than 1000 ppm, as measured by the Gas Chromatography Method described herein.

3. A bimodal copolymer comprising on average at least 90 weight-percent units derived from ethylene monomer and at least 0.05 weight percent units derived from an $\alpha$-olefin comonomer having from 4 to 10 carbon atoms, based on total weight of the copolymer, wherein:

(a) the copolymer comprises at least 45 weight percent of a higher molecular weight fraction having a weight-average molecular weight (Mw) of at least 400,000, measured by the Gel Permeation Chromatography (GPC) Test Method described in the description; and (b) the copolymer comprises at least 35 weight percent of a lower molecular weight fraction having a weight-average molecular weight (Mw) of at most 50,000, measured by the GPC Test Method; and (c) the copolymer has an overall melt flow ratio ($I_{21}/I_2$) of at least 90, measured according to ASTM D1238-13 (190° C., 21.6 kg or 2.16 kg); and (d) the copolymer has an overall z-average molecular weight/weight-average molecular weight (Mz/Mw) ratio of at least 8, measured by the GPC Test Method; and (e) the Oligomer Content of the copolymer is no more than 1000 parts per million by weight (ppm), based on 1,000,000 weight parts of the copolymer, measured using the Gas Chromatography Method; and (f) the copolymer has a PENT value (2.4 MPa and 80° C.) of at least 600 hours, measured according to ASTM F1473-18.

4. A bimodal copolymer comprising on average at least 90 weight-percent units derived from ethylene monomer and at least 0.05 weight percent units derived from an α-olefin comonomer having 4-10 carbon atoms, wherein:

(a) The copolymer comprises at least 45 weight percent of a higher molecular weight fraction having a weight-average molecular weight ($M_w$) of at least 400,000; and (b) The copolymer comprises at least 35 weight percent of a lower molecular weight fraction having a weight-average molecular weight ($M_w$) of at most 50,000; and (c) The overall melt flow ratio ($I_{21}/I_2$) of the copolymer is at least 90; and (d) The overall Mz/Mw ratio of the copolymer is at least 8; and (e) The Oligomer Content of the copolymer is no more than 1000 ppm, as measured by the Gas Chromatography Method described herein; and (f) the copolymer was produced by polymerizing the ethylene monomer and the α-olefin comonomer in the presence of a bimodal catalyst system that contains both:

(i) a (cyclopentadienyl)(1,5-dimethylindenyl)zirconium $(X)_2$ component, wherein X is a moiety that completes the valence of the zirconium; and (ii) a bis(2-(pentamethylphenylamido)ethyl)amine zirconium dibenzyl component.

5. A bimodal copolymer comprising on average at least 90 weight-percent units derived from ethylene monomer and at least 0.05 weight percent units derived from an α-olefin comonomer having 4-10 carbon atoms, wherein:

(a) The copolymer comprises at least 45 weight percent of a higher molecular weight fraction having a weight-average molecular weight ($M_w$) of at least 400,000; and (b) The copolymer comprises at least 35 weight percent of a lower molecular weight fraction having a weight-average molecular weight ($M_w$) of at most 50,000; and (c) The overall melt flow ratio ($I_{21}/I_2$) of the copolymer is at least 90; and (d) The overall Mz/Mw ratio of the copolymer is at least 8; and (e) The Oligomer Content of the copolymer is no more than 1000 ppm, as measured by the Gas Chromatography Method described herein; and (f) The copolymer further comprises at least 20 ppb of a dimethyl-1H-indenyl compound.

6. The bimodal copolymer of any one of Aspects 1 to 5 wherein the overall melt flow ratio ($I_{21}/I_5$) of the copolymer is 22-35.

7. The bimodal copolymer of any one of Aspects 1 to 6 wherein the copolymer has a PENT value (2.4 MPa and 80° C.) of at least 600 hours.

8. The bimodal copolymer of any one of Aspects 1 to 7 wherein the copolymer was produced by polymerizing the ethylene monomer and the α-olefin comonomer in the presence of a bimodal catalyst system that contains both:

(i) a (cyclopentadienyl)(1,5-dimethylindenyl)zirconium $(X)_2$ component, wherein X is a moiety that completes the valence of the zirconium; and ii) a bis(2-(pentamethylphenylamido)ethyl)amine zirconium dibenzyl component.

9. The bimodal copolymer of any one of Aspects 1 to 8 wherein the copolymer further comprises at least 20 ppb of a dimethyl-1H-indenyl compound.

10. The bimodal copolymer of any one of Aspects 1 to 9 wherein the α-olefin comonomer is 1-hexene and on average 1 to 5 weight percent units of repeating units in the copolymer are derived from 1-hexene.

11. The bimodal copolymer of any one of Aspects 1 to 10 wherein the overall density of the copolymer is 0.945 gram per cubic centimeter ($g/cm^3$) to 0.955 $g/cm^3$, measured according to ASTM D792-13 (Method B).

12. The bimodal copolymer of any one of Aspects 1 to 11, wherein the higher molecular weight fraction makes up at least 50 weight percent of the copolymer and/or wherein the higher molecular weight fraction makes up no more than 65 weight percent of the copolymer.

13. The bimodal copolymer of any one of Aspects 1 to 12 wherein the Flow index ($I_{21}$) is 8 decigrams per minute (dg/min) to 12 dg/min, measured according to ASTM D1238-13.

14. The bimodal copolymer of any one of Aspects 1 to 13, wherein the overall flow ratio ($I_{21}/I_2$) of the copolymer is from 100 to 150, measured according to ASTM D1238-13 for both $I_{21}$ and 12.

15. The bimodal copolymer of any one of Aspects 1 to 14 wherein the molecular weight ratio $M_w/M_n$ is from 30 to 50, measured by the GPC Test Method.

16. The bimodal copolymer of any one of Aspects 1 to 15 wherein the overall Mz/Mw ratio of the copolymer is 9 to 15, measured by the GPC Test Method.

17. The bimodal copolymer of any one of Aspects 1 to 16 wherein copolymer achieve a PENT value (at 2.4 MPa) of at least 800 hours, measured according to ASTM F1473-18.

18. The bimodal copolymer of any one of Aspects 1 to 17 wherein copolymer achieve a PENT value (at 2.4 MPa) of at least 1000 hours, measured according to ASTM F1473-18.

19. The bimodal copolymer of any one of Aspects 1 to 18 which has been made by polymerizing ethylene and the α-olefin comonomer in a single fluidized-bed, gas-phase reactor using a bimodal catalyst system.

20. The bimodal copolymer of Aspect 19 wherein the bimodal catalyst system comprises a (cyclopentadienyl)(1, 5-dimethylindenyl)zirconium $(X)_2$ component, wherein X is a moiety that completes the valence of the zirconium.

21. A polymer formulation comprising the bimodal copolymer of any one of Aspects 1 to 20 and at least one antioxidant and at least one catalyst neutralizer.

22. A film comprising the bimodal copolymer of any one of Aspects 1 to 12 or the polymer formulation of aspect 21, the film having a thickness of 0.0077 millimeters (mm) to 0.254 mm.

23. A method to make a blown film, the method extruding a melt of the copolymer of any one of Aspects 1 to 22 or the polymer formulation of aspect 13 through a die configured for forming a bubble so as to make a bubble of the bimodal copolymer or polymer formulation, and inflating the bubble with a film-blowing machine, thereby making the blown film.

EXAMPLES

Catalyst Synthesis

Synthesis of (cyclopentadienyl)(1,5-dimethylindenyl)zirconium dimethyl. In a glovebox under an anhydrous inert gas atmosphere (anhydrous nitrogen or argon gas), 3,6-dimethyl-1H-indene (1.000 g, 6.94 moles) in dimethoxyethane (10 mL) is added to a 120 mL (4-ounce (oz)) container, which is then capped, and the contents of the container are chilled to −35° C. n-butyllithium (1.6M hexanes, 4.3 mL, 0.0069 mole) is added to the container, and the contents are stirred for approximately 3 hours while heat is removed to maintain the contents of the container near −35° C. Reaction progress is monitored by dissolving a small aliquot in d8-THF for $^1$H NMR analysis. The reaction is complete after approximately 3 hours and the contents of the container are stirred for approximately 12 more hours. When the reaction is complete, solid cyclopentadienyl zirconium trichloride (CpZrCl$_3$) (1.821 g) is added in portions to the contents of the container while stirring. Then, methylmagnesium bromide (3.0M in ether, 4.6 mL) is added to the contents of the container, and after the addition the contents are stirred for approximately 12 hours. Then, solvent is removed in vacuo and the product is extracted into hexane (40 mL) and filtered through diatomaceous earth, washed with additional hexane (30 mL) and then dried in vacuo to provide the cyclopentadienyl(1,5-dimethylindenyl) zirconium dimethyl. (Cyclopentadienyl)(1,5-dimethylindenyl)zirconium dimethyl is confirmed by proton nuclear magnetic resonance spectroscopy ($^1$H NMR) analysis. $^1$H NMR (C$_6$D$_6$): δ 7.26 (d, 1H), 6.92 (d, 1H), 6.83 (dd, 1H), 5.69 (d, 1H), 5.65 (m, 1H), 5.64 (s, 5H), 2.18 (s, 3H), 2.16 (s, 3H), −0.34 (s, 3H), −0.62 (s, 3H). This product forms the low molecular weight component of the Bimodal Catalyst, and it is the trim catalyst.

Synthesis of Bimodal Catalyst. Slurry 70.3 parts by weight of treated fumed silica (CABOSIL TS-610) in 1000 parts by weight of toluene, followed by adding 171 parts by weight of a 30 wt % solution of methylaluminoxane (MAO) in toluene, 3.54 parts by weight of bis(2-(pentamethylphenylamido)ethyl)amine zirconium dibenzyl and 0.229 parts by weight of (Cp)(1,5-dimethylindenyl)ZrMe$_2$. Using a spray dryer set at 160° C. and with an outlet temperature at 70° to 80° C., introduce the mixture into an atomizing device of the spray dryer to produce droplets of the mixture, which are then contacted with a hot nitrogen gas stream to evaporate the liquid from the mixture to give a powder. Separate the powder from the gas mixture in a cyclone separator and discharge the separated powder into a container to give the catalyst as a fine powder. Slurry the resultant powder to give an activator formulation of 22 wt % solids in 10 wt % isoparaffin fluid and 68 wt % mineral oil.

Granular Copolymer Synthesis and Testing

Ethylene and 1-hexene are copolymerized in a fluidized bed, gas-phase polymerization reactor ("FB-GPP reactor") having a reaction zone dimensioned as 304.8 mm (twelve inch) internal diameter and a 2.4384 meter (8 feet) in straight-side height and containing a fluidized bed of granules of bimodal ethylene-co-1-hexene copolymer. The FB-GPP reactor has a recycle gas line for flowing a recycle gas stream. It has gas feed inlets and polymer product outlet.

Three different runs of copolymer production are performed, named IE1, 1E2 and Comp A. Runs IE1 and 1E2 are examples of this invention. Comp A is a comparative example. Before each run, the reactor is purged with anhydrous nitrogen and brought to the temperature and pressure shown in Table 1. Then, ethylene, hexene, hydrogen, bimodal catalyst, trim catalyst, induced condensing agent and continuity additive are fed into the reactor in the quantities and under the conditions shown in Table 1.

TABLE 1

| Operating conditions for IE1, IE2 and Comp A. | | | |
|---|---|---|---|
| Conditions | IE1 | IE2 | Comp A |
| Bed Temp. (° C.) | 95 | 90 | 90 |
| Rx Pressure (kPa)` | 2420 | 2420 | 2420 |
| C$_2$ Partial Pressure (kPa) | 1517 | 1517 | 1517 |
| H$_2$/C$_2$ Molar Ratio | 0.0039 | 0.0040 | 0.0040 |
| C$_6$/C$_2$ Molar Ratio | 0.0071 | 0.0062 | 0.0056 |
| Induced Conden. Agent (mol %) | 1-methyl-butane (11.1) | 1-methyl-butane (11.9) | 1-methyl-butane (11.8) |
| Superficial Gas Velocity (m/sec) | 0.61 | 0.55 | 0.61 |
| Bimodal Catalyst System | See description | See description | PRODIGY ™ BMC300 |
| Trim catalyst | See description | See description | UT-TR-300 |
| Catalyst Flow (g/hour) | 3.0 | 5.7 | 4.0 |
| Trim/Cat (0.5 wt % trim) | 0.28 | 0.54 | 0.29 |
| CA-300 Continuity Additive (ppm) | 42 | 45 | 32 |
| Catalyst Zr conc. (wt %) | 0.43 | 0.43 | 0.41 |
| Catalyst Al conc. (wt %) | 18.9 | 18.6 | 15.8 |
| Starting seedbed = granular HDPE resin | Preloaded | Preloaded | Preloaded |
| Fluidized Bed Weight (kg) | 50 | 44 | 45 |
| Copolymer Production Rate (kg/hour) | 12 | 16 | 14 |
| Copolymer Residence Time (hour) | 4 | 3 | 3 |
| Copolymer Fluid Bulk Density, (kg/m$^3$) | 268 | 282 | 247 |

TABLE 1-continued

| Operating conditions for IE1, IE2 and Comp A. | | | |
|---|---|---|---|
| Conditions | IE1 | IE2 | Comp A |

Granular copolymer from the reactor is continuously discharged into a discharge tank, which is purged with nitrogen for 10-30 seconds before being dumped into a fiberpack and then purged again with a mixture of nitrogen and moisture for 3 hours. Properties of the granular copolymers are measured using the test methods described at the end of these Examples. Results are reported below in Table 2.

TABLE 2

| Copolymer properties. | | | |
|---|---|---|---|
| Property | IE1 | IE2 | Comp A |
| QC Density (g/cm$^3$) | 0.951 | 0.951 | 0.951 |
| Flow Index, $I_{21}$ (dg/min) | 9.5 | 7.9 | 9.7 |
| MFR2, $I_{21}/I_2$ | 100 | 110 | 94 |
| MFR5, $I_{21}/I_5$ | 26.1 | 26.9 | 25.7 |

Pelleting and Properties

A portion of each granular resin is extruded in a bench scale extruder to form pellets without oxygen tailoring. The properties of the pellets shown in the Table 3 below are measured from the pellets, using the test methods described below.

TABLE 3

| Property | IE1 | IE2 | Comp A |
|---|---|---|---|
| HMW Component Split (wt %) | 53.7 | 55.5 | 54.4 |
| $M_{w\text{-}HMW}/M_{w\text{-}LMW}$ ratio | 41.1 | 47.3 | 41.8 |
| Overall $M_n$ (kg/mol) | 7759 | 7,227 | 7731 |
| Overall $M_w$ (kg/mol) | 289,082 | 316,269 | 279,289 |
| Overall $M_z$ (kg/mol) | 3,252,507 | 3,640,843 | 1,912,981 |
| Overall $M_w/M_n$ | 37.3 | 43.8 | 36.1 |
| Overall $M_z/M_w$ | 11.3 | 11.5 | 6.9 |
| LMW $M_n$ (kg/mol) | 3,580 | 3,216 | 3,318 |
| LMW $M_w$ (kg/mol) | 12,370 | 11,367 | 12,065 |
| LMW $M_w/M_n$ | 3.5 | 3.5 | 3.6 |
| HMW $M_n$ (kg/mol) | 109,275 | 106,804 | 105,848 |
| HMW $M_w$ (kg/mol) | 507,939 | 537,467 | 503,768 |
| HMW $M_w/M_n$ | 4.6 | 5.0 | 4.8 |
| Melt Elasticity, G'/G" @ 0.1 | 0.427 | 0.476 | 0.447 |
| PENT, 2.4 MPa @ 80° C. (hr.) | 1330 | 1270 | 467 |
| PENT, 3.0 MPa @ 80° C. (hr.) | 846 | 678 | 259 |
| Total VOC Content (ppm) | 691 | 532 | 1182 |
| Oligomer Content (ppm) | 557 | 775 | 1035 |

N/m not measured.

A portion of the granular copolymer from 1E1 is separately mixed with 800 parts per million weight/weight (ppm) of Antioxidant 1, 200 ppm Antioxidant 2, 1,000 ppm Catalyst Neutralizer 1, and 500 ppm Catalyst Neutralizer 2 in a ribbon blender, and then compounded into strand cut pellets using a twin-screw extruder LCM100 according to the methods described in U.S. Pat. No. 5,728,335 and U.S. Pat. No. 6,989,423 using the oxygen (O$_2$) tailoring level in Table 4. Properties of the resulting copolymer are measured and reported below in Table 4.

Antioxidants: 1. Pentaerythritol tetrakis(3-(3,5-di(1',1'-dimethylethyl)-4-hydroxyphenyl)propionate); obtained as IRGANOX 1010 from BASF. 2. Tris(2,4-di(1',1'-dimethyl-ethyl)-phenyl)phosphite. Obtained as IRGAFOS 168 from BASF.

Catalyst Neutralizers: 1. Calcium stearate. 2. Zinc stearate.

TABLE 4

| Melt properties | |
|---|---|
| Property | IE1 |
| O$_2$ tailoring level (%) | 7 |
| Density (g/cm$^3$) | 0.950 |
| $I_{21}$ (190° C., 21.6 kg) (dg/min.) | 8.5 |
| MFR5 ($I_{21}/I_5$) | 30.2 |
| MFR2 ($I_{21}/I_2$) | 120 |

Film Forming Procedure:

Pellets of the copolymers are separately extruded and made into blown films using an Alpine 50 millimeter (mm) 25:1 length to diameter (L/D) dimensioned barrier single screw extruder, a 120 mm inner diameter die, a 1.2 mm die gap, without IBC (internal bubble cooling). The properties are measured on films having a thickness of 0.0127 millimeter (mm)=12.7 micrometer (μM). See below Table 5. The inventive example 1E1 has higher dart and puncture than the comparative example Comp A, while maintaining similar tear strength and stress at break.

TABLE 5

| Film properties. | | |
|---|---|---|
| Property | IE1 | Comp A |
| melt elasticity (G'/G"@0.1 rad/s) | 0.631 | 0.624 |
| Dart (g) | 482 | 401 |
| Tear Strength, MD (g) | 19.5 | 20.5 |
| Tear Strength, TD (g) | 65.8 | 47.6 |

TABLE 5-continued

| Film properties. | | |
| --- | --- | --- |
| Property | IE1 | Comp A |
| Stress at Break, MD (MPa) | 50.4 | 49.3 |
| Stress at Break, TD (MPa) | 41.5 | 33.8 |
| Puncture Resistance, J/cm³ | 6.50 | 5.25 |

TABLE 6

| Test Methods | |
| --- | --- |
| Measurement | Test Method |
| Density | ASTM D792-13, *Standard Test Methods for Density and Specific Gravity (Relative Density) of Plastics by Displacement,* Method B (for testing solid plastics in liquids other than water, e.g., in liquid 2-propanol). QC Density is measured after conditioning 10 to 15 min and density is measured after conditioning at least 40 hours. |
| Melt Index ("I₂") | ASTM D1238-13, Standard Test Method for Melt Flow Rates of Thermoplastics by Extrusion Platometer, using conditions of 190° C./2.16 kg, formerly known as "Condition E". |
| Melt Index I₅ ("I₅") | ASTM D1238-13, *Standard Test Method for Melt Flow Rates of Thermoplastics by Extrusion Platometer,* using conditions of 190° C./5.0 kg. |
| High Load Melt Index (HLMI) I₂₁ | ASTM D1238-13, *Standard Test Method for Melt Flow Rates of Thermoplastics by Extrusion Platometer,* using conditions of 190° C./21.6 kilograms (kg) |
| Melt Elasticity | On polymer melts at 190° C. perform small-strain (10%) oscillatory shear at varying frequency from 100 radians per second (rad/s) to 0.1 rad/s using an ARES-G2 Advanced Rheometric Expansion System, from TA Instruments, with parallel-plate geometry to obtain the G'/G" ratio value at a dynamic frequency equal to 0.1 rad/s. |
| Tear Strength | ASTM D1922-15, Standard Test Method for Propagation Tear Resistance of Plastic Film and Thin Sheeting by Pendulum Method |
| Stress at Break | ASTM D882-18, Standard Test Method for Tensile Properties of Thin Plastic Sheeting |
| Pennsylvania Edge Notch Tensile (PENT) | ASTM F1473 - 18, Standard Test Method for Notch Tensile Test to Measure the Resistance to Slow Crack Growth of Polyethylene Pipes and Resins |
| Dart Impact | ASTM D1709-16a, *Standard Test Methods for Impact Resistance of Plastic Film by the Free-Falling Dart Test Method,* Method A. |
| Puncture Resistance | ASTM D 5748-95, Standard Test Method for Protrusion Puncture Resistance of Stretch Wrap Film |

Molecular Weight

Molecular weights, including peak molecular weight ($M_{p\ (GPC)}$), weight average molecular weight ($M_{w(GPC)}$), number average molecular weight ($M_{n(GPC)}$), and z-average molecular weight ($M_{z(GPC)}$), are measured using conventional Gel Permeation Chromatography (GPC) and are reported in grams per mole (g/mol).

The chromatographic system is a PolymerChar GPC-IR (Valencia, Spain) high temperature GPC chromatograph equipped with an internal IR5 infra-red detector (IR5). The autosampler oven compartment is set at 160° C. and the column compartment is set at 150° C. The columns used are four Agilent "Mixed A" 30 centimeter (cm) 20-micron linear mixed-bed columns. The chromatographic solvent used is 1,2,4 trichlorobenzene containing 200 parts per million (ppm) of butylated hydroxytoluene (BHT). The solvent source is nitrogen sparged. The injection volume used is 200 microliters (1.11) and the flow rate is 1.0 milliliters/minute (ml/min).

Calibration of the columns is performed with at least 20 narrow molecular weight distribution polystyrene standards with molecular weights ranging from 580 to 8,400,000 g/mol. Standards are arranged in 6 "cocktail" mixtures with at least a decade of separation between individual molecular weights. The standards are purchased from Agilent Technologies. The standards are prepared at 0.025 grams in 50 milliliters of solvent for molecular weights equal to or greater than 1,000,000 g/mol, and 0.05 grams in 50 milliliters of solvent for molecular weights less than 1,000,000 g/mol. The standards are dissolved at 80° C. with gentle agitation for 30 minutes. The standard peak molecular weights are converted to ethylene-based polymer molecular weights using Equation 1 (as described in Williams and Ward, J. Polym. Sci., Polym. Let., 6, 621 (1968)):

$$M_{polyethylene} = A \times (M_{polystyrene})^B \qquad \text{Equation 1}$$

where M is the molecular weight, A has a value of 0.4315, and B is equal to 1.0.

A fifth-order polynomial is used to fit the respective ethylene-based polymer-equivalent calibration points. (In our examples, a minor adjustment to A (from approximately 0.39 to 0.44) is needed to correct for column resolution and band-broadening effects such that NIST standard NBS 1475 is obtained at a molecular weight of 52,000 g/mol.)

The total plate count of the columns is performed with eicosane (prepared at 0.04 grams in 50 milliliters of TCB and dissolved with gentle agitation for 20 minutes). The plate count (Equation 2) and symmetry (Equation 3) are measured on a 200 microliter injection according to the following equations:

$$\text{Plate Count} = 5.54 \times \left( \frac{RV_{Peak\ Max}}{\text{Peak Width at half height}} \right)^2 \qquad \text{Equation 2}$$

where RV is the retention volume in milliliters, peak width is in milliliters, peak max is the maximum height of the peak, and half height is one half of the height of peak max, and $$\text{Symmetry} = \frac{(\text{Rear Peak } RV_{one\ lenth\ height} - RV_{Peak\ max})}{(RV_{Peak\ max} - \text{Front Peak } RV_{one\ tenth\ height})} \quad \text{Equation 3}$$

where RV is the retention volume in milliliters, peak width is in milliliters, peak max is the maximum height of the peak, one tenth height is one tenth of the height of peak max, rear peak refers to the peak tail at retention volumes later than peak max, and front peak refers to the peak front at retention volumes earlier than peak max. The plate count for the chromatographic system should be greater than 22,000 and symmetry should be between 0.98 and 1.22.

Samples are prepared in a semi-automatic manner with the PolymerChar "Instrument Control" Software, wherein the samples are weight-targeted at 2 milligrams per milliliter (mg/ml), and the solvent, which contained 200 ppm BHT, is added to a pre nitrogen-sparged septa-capped vial, via the PolymerChar high-temperature autosampler. The samples are dissolved under "low speed" shaking for 3 hours at 160° C.

The calculations of $M_{n(GPC)}$, $M_{w(GPC)}$, and $M_{z(GPC)}$ are based on GPC results using the internal IR5 detector (measurement channel) of the PolymerChar GPC-IR chromatograph according to Equations 4-7, using PolymerChar GPCOne™ software, the baseline-subtracted IR chromatogram at each equally-spaced data collection point i ($IR_i$) and the ethylene-based polymer equivalent molecular weight obtained from the narrow standard calibration curve for the point i ($M_{polyethylene,i}$ in g/mol) from Equation 1. Subsequently, a GPC molecular weight distribution (GPC-MWD) plot ($wt_{GPC}(lgMW)$) vs. IgMW plot, where $wt_{GPC}(lgMW)$ is the weight fraction of ethylene-based polymer molecules with a molecular weight of IgMW for the ethylene-based polymer sample can be obtained. Molecular weight (MW) is in g/mol and $wt_{GPC}(lgMW)$ follows the Equation 4.

$$\int wt_{GPC}(lgMW)d\ lgMW = 100 \quad \text{Equation 4}$$

$M_{n(GPC)}$, $M_{w(GPC)}$ and $M_{z(GPC)}$ are calculated by the following equations:

$$Mn_{(GPC)} = \frac{\sum_i IR_i}{\sum_i (IR_i / M_{polyethylene,i})} \quad \text{Equation 5}$$

$$Mw_{(GPC)} = \frac{\sum_i (IR_i * M_{polyethylene,i})}{\sum_i IR_i} \quad \text{Equation 6}$$

$$Mz_{(GPC)} = \frac{\sum_i (IR_i * M_{polyethylene,i}^2)}{\sum_i (IR_i * M_{polyethylene,i})} \quad \text{Equation 7}$$

$M_{p(GPC)}$ is the molecular weight at which the $wt_{GPC}$ (IgMW) had the highest value on the GPC-MWD plot.

In order to monitor the deviations over time, a flow rate marker (decane) is introduced into each sample via a micropump controlled with the PolymerChar GPC-IR system. This flow rate marker (FM) is used to linearly correct the pump flow rate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flow rate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flow rate (with respect to the narrow standards calibration) is calculated as Equation 11. Processing of the flow marker peak is done via the PolymerChar GPCOne™ Software. Acceptable flow rate correction is such that the effective flowrate should be within 0.5% of the nominal flowrate.

$$\text{Flow rate}_{effective} = \text{Flow rate}_{nominal} \times (RV(FM_{calibrated})/ \ RV(FM_{Sample})) \quad \text{Equation 8}$$

Bimodality Test Method: determine presence or absence of resolved bimodality by plotting dWf/dLogM (mass detector response) on y-axis versus LogM on the x-axis to obtain a GPC chromatogram curve containing local maxima log (MW) values for LMW and HMW polyethylene component peaks, and observing the presence or absence of a local minimum between the LMW and HMW polyethylene component peaks. The dWf is change in weight fraction, dLogM is also referred to as dLog(MW) and is change in logarithm of molecular weight, and LogM is also referred to as Log(MW) and is logarithm of molecular weight.

Deconvoluting Test Method: segment the chromatogram obtained using the Bimodality Test Method into nine (9) Schulz-Flory molecular weight distributions. Such deconvolution method is described in U.S. Pat. No. 6,534,604. Assign the lowest four MW distributions to the LMW polyethylene component and the five highest MW distributions to the HMW polyethylene component. Determine the respective weight percents (wt %) for each of the LMW and HMW polyethylene components in the bimodal ethylene-co-1-hexene copolymer by using summed values of the weight fractions (Wf) of the LMW and HMW polyethylene components and the respective number-average molecular weights ($M_n$), weight average molecular weight ($M_w$), and z-average molecular weights ($M_z$) by known mathematical treatment of aggregated Schulz-Flory MW distributions.

Total VOC Content is determined by the Full Evaporation Method.

Volatile organic compounds (VOC) are determined in polyethylene using headspace gas chromatography with a flame ionization detector. One pellet of natural resin, which weighs 0.04±0.02 g, and 0.005 g of Irganox 1330 are placed into a headspace vial and sealed. The VOCs are sampled using a headspace analyzer with the sample equilibrated at 190° C. for 120 min. A calibration solution is prepared with process solvent in methylene chloride. A 10 µL aliquot of the calibration solution is transferred using an electronic digital syringe into the headspace vial and the vial is immediately sealed with a cap using the crimping tool. The sum of peak area for the solvent peak in sample and calibration solution is summed. Quantitation is performed using an external standard calibration procedure. The data are reported as parts per million (ppm; μg/g).

Total Oligomer Content is determined by the Gas Chromatography Method.

About 5 grams of sample is weighed (and record to the nearest 0.0001-g) into a 120 mL (4-ounce (4-oz)) glass bottle followed by addition of 20 mL of methylene chloride. The bottle is sealed with a PTFE lined cap. The sample is extracted for 24 h at room temperature on a wrist shaker. An aliquot of the extract is removed with a glass pipette and transferred to a 2 mL glass autosampler vial. The vial is caped and placed on the gas chromatograph for analysis. The sample extract, methylene chloride blank, and certified reference standard (Ultra Scientific, C10 to C44, even number of hydrocarbons, 200 parts per million (ppm) of n-decane, n-tetradecane, and n-tricosane and all other components are 100 ppm in hexane) are analyzed by GC with a split/splitless inlet and flame ionization detector. The peak area for all peaks eluting between methylene chloride and $C_{44}H_{90}$ is determined using a chromatographic data system. The peak areas for additives, such as Irgafos 168, oxidized 1-168 and Irganox 1076 are excluded using the settings in the chromatographic data system. The parts per million of oligomers is calculation from the total peak area of the oligomer peaks in the sample and the peak area of the 100 ppm n-eicosane ($C_{20}H_{42}$) peak in the calibration standard using an external standard calibration procedure. The data for oligomers in resin are reported in parts per million (ppm; μg/g).

The invention claimed is:

1. A bimodal copolymer comprising on average at least 90 weight-percent units derived from ethylene monomer and at least 0.05 weight percent units derived from an α-olefin comonomer having from 4 to 10 carbon atoms, based on total weight of the bimodal copolymer, wherein:

(a) the bimodal copolymer comprises at least 45 weight percent of a higher molecular weight fraction having a weight-average molecular weight (Mw) of at least 400,000, measured by "a gel permeation chromatography (GPC) test method described in the description; and (b) the bimodal copolymer comprises at least 35 weight percent of a lower molecular weight fraction having a weight-average molecular weight (Mw) of at most 50,000, measured by the GPC test method; and (c) the weight average molecular weight ($M_w$) of the higher molecular weight fraction is 30 to 50 times the weight average molecular weight ($M_w$) of the lower molecular weight fraction; and (d) the bimodal copolymer has an overall melt flow ratio ($I_{21}/I_2$) of at least 90, measured according to ASTM D1238-13(190° C., 21.6 kg or 2.16 kg); and (e) the bimodal copolymer has an overall z-average molecular weight/weight-average molecular weight (Mz/Mw) ratio of at least 8, measured by the GPC test method; and (f) an oligomer content of the bimodal copolymer is no more than 1000 parts per million by weight (ppm), based on 1,000,000 weight parts of the bimodal copolymer, measured using the gas chromatography test method; and (g) the bimodal copolymer further comprises at least 20 ppb of a dimethyl-1H-indenyl compound.

2. The bimodal copolymer of claim 1 wherein the-an overall melt flow ratio ($I_{21}/I_5$) of the bimodal copolymer is 22 to 35.

3. The bimodal copolymer of claim 1 wherein the bimodal copolymer has a PENT value (2.4 MPa and 80° C.) of at least 600 hours, measured according to ASTM F1473-18.

4. The bimodal copolymer of claim 1 wherein the bimodal copolymer is produced by polymerizing the ethylene monomer and the α-olefin comonomer in the presence of a bimodal catalyst system that contains both:

(i) a (cyclopentadienyl) (1,5-dimethylindenyl) zirconium $(X)_2$ component, wherein X is a moiety that completes the valence of the zirconium; and ii) a bis (2-(pentamethylphenylamido) ethyl) amine zirconium dibenzyl component.

5. The bimodal copolymer of claim 1 wherein the α-olefin comonomer is 1-hexene and on average 1 to 5 weight percent units of repeating units in the bimodal copolymer are derived from 1-hexene.

6. The bimodal copolymer of claim 1 wherein an overall density of the bimodal copolymer is 0.945 gram per cubic centimeter ($g/cm^3$) to 0.955 $g/cm^3$, measured according to ASTM D792-13 (Method B).

7. The bimodal copolymer of claim 1, wherein the higher molecular weight fraction makes up 50 to 65 weight percent of the bimodal copolymer.

8. The bimodal copolymer of claim 1 wherein a flow index ($I_{21}$) is 8 decigrams per minute (dg/min) to 12 dg/min, measured according to ASTM D1238-13.

9. The bimodal copolymer of claim 1, wherein the overall melt flow ratio ($I_{21}/I_2$) of the bimodal copolymer is from 100 to 150, measured according to ASTM D1238-13 for both $I_{21}$ and $I_2$.

10. The bimodal copolymer of claim 1 wherein a molecular weight ratio $M_w/M_n$ is from 30 to 50, measured by the GPC test method.

11. The bimodal copolymer of claim 1 wherein bimodal copolymer achieves a PENT value (at 2.4 MPa and 80° C.) of at least 1000 hours, measured according to ASTM F1473-18.

12. The bimodal copolymer of claim 1 wherein the bimodal copolymer is made by polymerizing ethylene and the α-olefin comonomer in a single fluidized-bed, gas-phase reactor in the presence of a bimodal catalyst system.

13. A film comprising the bimodal copolymer of claim 1, wherein the film has a thickness of 0.0077 millimeters (mm) to 0.254 mm.

14. A method to make a blown film, the method comprising extruding a melt of the bimodal copolymer of claim 1 through a die configured for forming a bubble so as to make a bubble of the bimodal copolymer, and inflating the bubble with a film-blowing machine, thereby making the blown film.

15. A bimodal copolymer comprising on average at least 90 weight-percent units derived from ethylene monomer and 1 to 5 weight percent units of repeating units in the bimodal copolymer are derived from 1-hexene, based on total weight of the bimodal copolymer, wherein:

(a) the bimodal copolymer comprises at least 45 weight percent of a higher molecular weight fraction having a weight-average molecular weight ($M_w$) of at least 400,000, measured by "a gel permeation chromatography (GPC) test method described in the description; and (b) the bimodal copolymer comprises at least 35 weight percent of a lower molecular weight fraction having a weight-average molecular weight (Mw) of at most 50,000, measured by the GPC test method; and (c) the weight average molecular weight ($M_w$) of the higher molecular weight fraction is 30 to 50 times the weight average molecular weight ($M_w$) of the lower molecular weight fraction; and (d) the bimodal copolymer has an overall melt flow ratio (b $I_{21}/I_2$) of at least 90, measured according to ASTM D1238-13 (190° C., 21.6 kg or 2.16 kg); and (e) the bimodal copolymer has an overall z-average molecular weight/weight-average molecular weight (Mz/Mw) ratio of at least 8, measured by the GPC test method; and (f) an oligomer content of the bimodal copolymer is no more than 1000 parts per million by weight (ppm), based on 1,000,000 weight parts of the bimodal copolymer, measured using the gas chromatography test method.

* * * * *